United States Patent Office
3,433,102
Patented Mar. 18, 1969

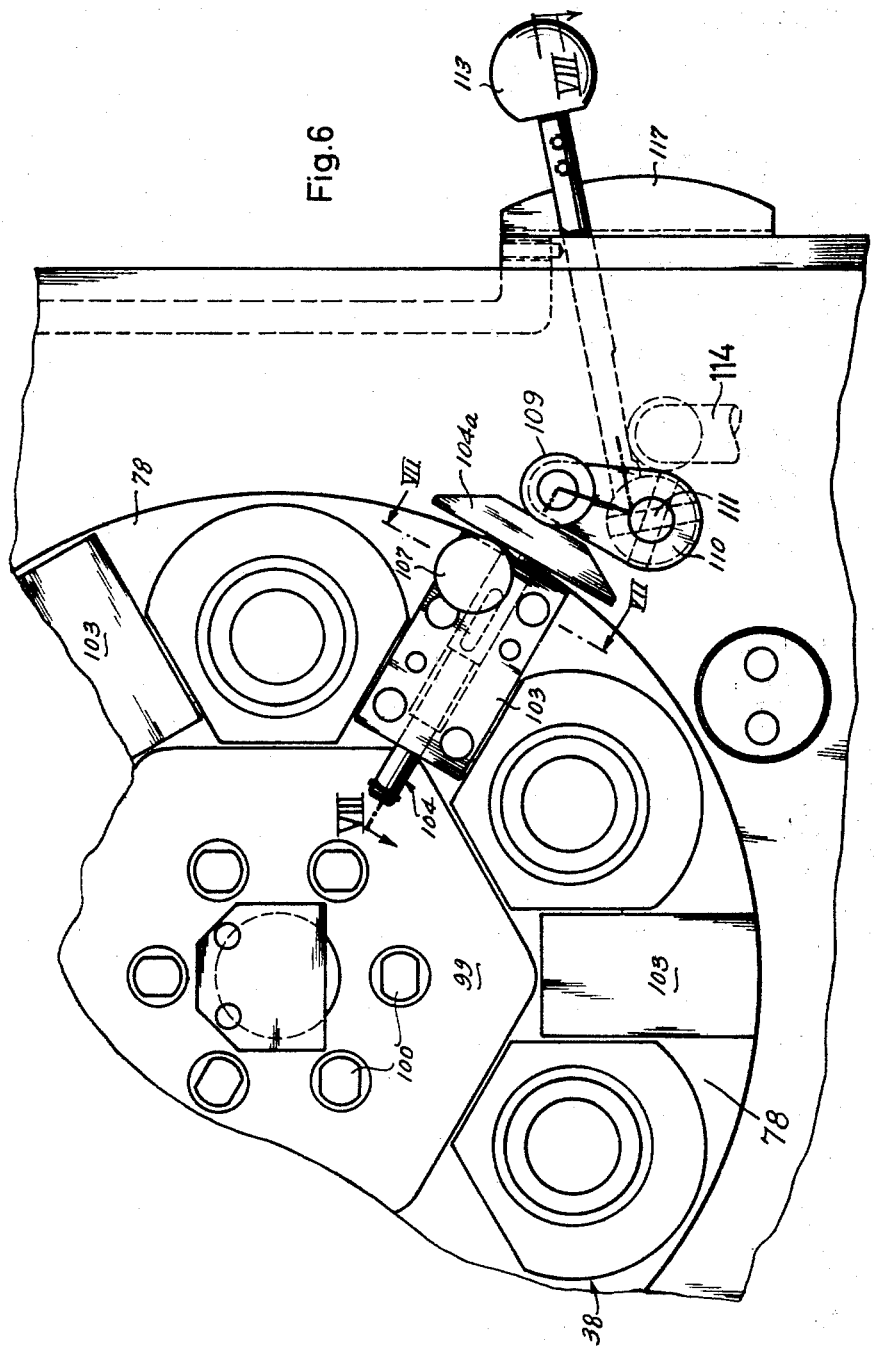

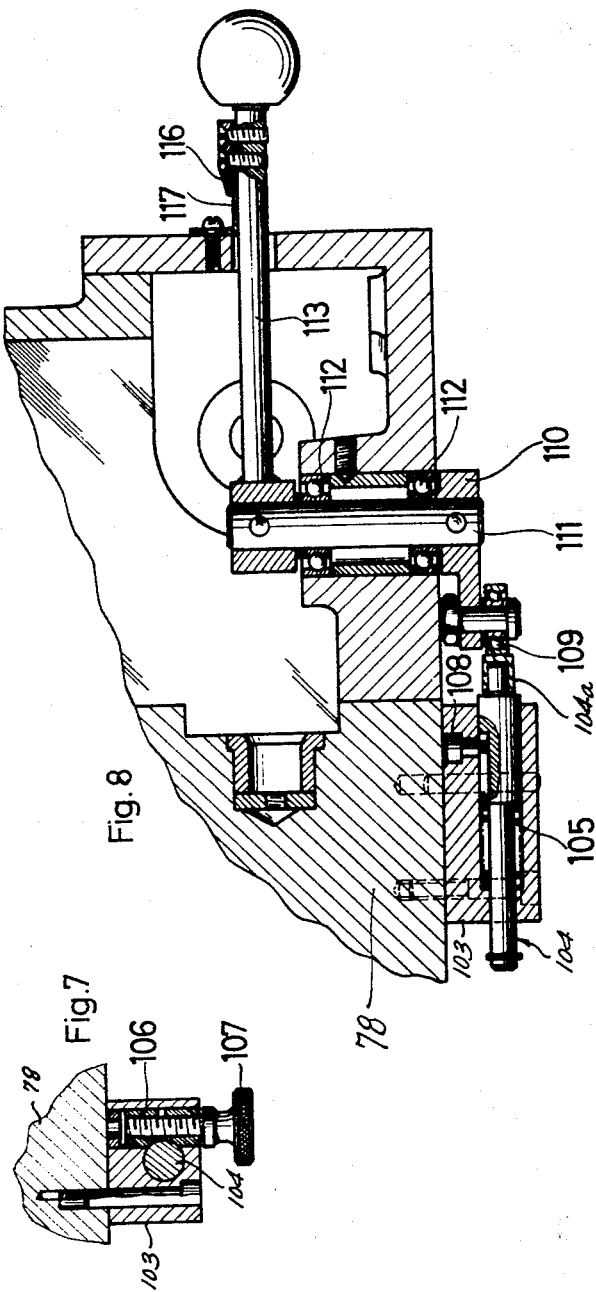

3,433,102
MULTISPINDLE MACHINE TOOL
Mikas Baublys, Ludwigsburg-Grunbuhl, Eugen Sigloch, Stuttgart-Zazenhausen, and Gotthilf Stark, Ebersbach-Sulpach, Germany, assignors to Firma Gotthilf Stark, Schlierbach, Teck, Germany
Filed Mar. 7, 1966, Ser. No. 532,240
Claims priority, application Germany, Mar. 5, 1965, St 23,463
U.S. Cl. 77—4
Int. Cl. B23b 39/16
44 Claims

ABSTRACT OF THE DISCLOSURE

A multispindle machine tool in which a plurality of spindle assemblies are removably and reciprocatably carried by an indexing member to be by movement of the latter successively brought in a working position aligned with a drive shaft, in which the drive shaft is reciprocatable to be coupled with the aligned spindle assembly to drive the latter, and in which each of the spindle assemblies has its own gear transmission so that the drive shaft may be driven for all spindle assemblies with the same speed while a tool connected to the output shaft of the respective spindle assembly will be driven according to the gear transmission of the respective assembly.

---

The present invention relates to machine tools in general, and more particularly to improvements in machines which may be utilized for boring, drilling, thread cutting, reaming, abrading and similar treatment of workpieces. Still more particularly, the invention relates to a machine wherein a workpiece may be treated successively by a series of different boring or like tools.

It is already known to provide a boring mill with a turret or head for a series of rotary tool spindles each of which carries or can carry a different boring tool. The workpiece must be placed in registry with a selected spindle and the turret is then displaced to move the tool carried by the selected spindle into actual engagement with the workpiece. The remaining spindles participate in such displacement but do not move their tools into engagement with the workpiece. Once the operation is completed, the turret with all of the spindles thereon is withdrawn and the workpiece is placed into registry with a different spindle whereupon the just described operation is repeated by shifting the turret toward the workpiece. Such machines are very complicated because, and particularly if the workpiece is moved by an automatic feeding device, the provision of such feeding device adds considerably to the initial cost. Also, the wear on the transmission which drives the spindles is very high.

It is also known to fixedly secure the workpiece to a table or another suitable work holder and to fixedly mount a series of spindles on an indexible turret. Each spindle is driven at a different speed and the turret is indexed and moved toward and away from the fixedly held workpiece. A serious drawback of such machines is that the transmission which drives the permanently installed spindles at different speeds is very bulky and complicated, especially since the transmission must remain in torque-transmitting engagement with all of the spindles despite the fact that the turret is indexible to a plurality of different positions. Also, removal and replacement of more or less permanently installed spindles involves much work because a spindle which is to be removed or replaced must be disconnected from the transmission.

Accordingly, it is an important object of the present invention to provide a multiple-spindle machine tool, particularly a boring mill or a vertical lathe, which is constructed and assembled in such a way that each of its tool spindles may be driven at a different speed and that each such spindle may be rapidly and conveniently removed or reinserted into the machine without necessitating any dismantling of the transmission which serves to rotate the spindle at a selected speed.

Another object of the invention is to provide very simple, compact and inexpensive drive which may be utilized in the improved machine to rotate the tool spindles at selected speeds.

A further object of the instant invention is to provide a machine which can perform on a fixed workpiece a series of boring, drilling, reaming, thread cutting or other operations and which can place a series of successive tool spindles in requisite position for engagement of respective tools with the workpiece.

An additional object of the present invention is to provide a novel spindle assembly or spindle-containing unit which can be used in a machine of the above outlined characteristics.

A concomitant object of the invention is to provide a novel indexing mechanism which can be used in the improved machine to place a series of successive tool spindles in requisite position for engagement of their tools with the workpiece.

Still another object of the invention is to provide a novel programming unit which can be incorporated in the improved machine to effect movements of successive tools into and from engagement with the workpiece and to control the feed of such tools in the course of actual engagement with a workpiece.

A further object of the invention is to provide a highly versatile boring or like machine which can be rapidly converted for treatment of many different types of workpieces and wherein the conversion from one setup to another setup requires little time and may be carried out by semi-skilled persons.

An additional object of the invention is to provide a machine of the above outlined characteristics wherein the programming unit may be rapidly and conveniently adjusted to control the sequence of steps in each of a series of widely different operations, such as boring, drilling, reaming, thread cutting, counterboring, spot facing, precision drilling, grinding, abrading, grooving, channeling and others.

Another object of the invention is to provide a machine of the above outlined character which can be used for treatment of hard, soft, brittle, tough or other metallic or nonmetallic materials and which can utilize an exceptionally wide variety of tools.

A further object of the invention is to provide a semiautomatic or fully automatic boring or like machine which may be produced at reasonable cost and wherein the length of intervals during which the tools are out of actual material-removing engagement with the work is reduced to a minimum so that the output is considerably higher than in an equivalent machine of conventional design.

Briefly stated, one feature of our invention resides in the provision of a machine tool, particularly a vertical boring mill, which comprises essentially a frame, a rotary drive shaft which is reciprocably received in the frame and comprises a coupling member, indexing means comprising an indexing member movable in the frame to a plurality of positions (preferably by rotating through angles of identical magnitude about a fixed axis which is parallel to the axis of the drive shaft), a plurality of specially constructed spindle assemblies which are removably and reciprocably supported by the indexing member in such distribution that one thereof can register with the drive shaft between successive movements of the indexing member, each spindle assembly comprising a rotary input member provided with a complementary coupling member which is aligned with the coupling member of the drive shaft when the latter registers with the respective assembly and a rotary output member which can be directly coupled to a boring or like tool, and reciprocating means for moving the shaft toward and away from the indexing member so that, while moving toward the indexing member, the coupling member of the drive shaft can engage and transmit torque to the aligned complementary coupling member. The machine tool further comprises a drive which is preferably coupled with the drive shaft in automatic response to displacement of the drive shaft toward a registering spindle assembly, and the reciprocating means is arranged to move the drive shaft through strokes of such length that, subsequent to engagement of the coupling member on the drive shaft with a complementary coupling member, the respective assembly is shifted with reference to the indexing member in order to move the corresponding tool into actual engagement with a fixed workpiece.

Certain other features of the invention reside in the provision of a specially constructed Geneva movement which forms part of the indexing means, in the provision of a special programming unit which controls rapid advance and feed movements of the spindle assemblies, in the provision of a specially constructed drive for the drive shaft, in the provision of a fluid-operated unit which forms part of the reciprocating means for the drive shaft, and in the provision of a novel holder for that spindle assembly which registers with the drive shaft. The term "registering" or "position of registry" is intended to denote such position of a spindle assembly in which the latter's transmission can be automatically coupled with the drive shaft when the drive shaft is shifted with reference to the frame in a direction to move toward a fixed workpiece.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of a specific embodiment with reference to the accompanying drawings, in which:

FIG. 6 is an enlarged fragmentary bottom plan view of the indexing member, substantially as seen in the direction of the arrow VI in FIG. 1;

FIG. 7 is a fragmentary section as seen in the direction of arrows from the line VII—VII of FIG. 6; and FIG. 8 is another section substantially as seen in the direction of arrows from the line VIII—VIII of FIG. 6.

Figure 1:
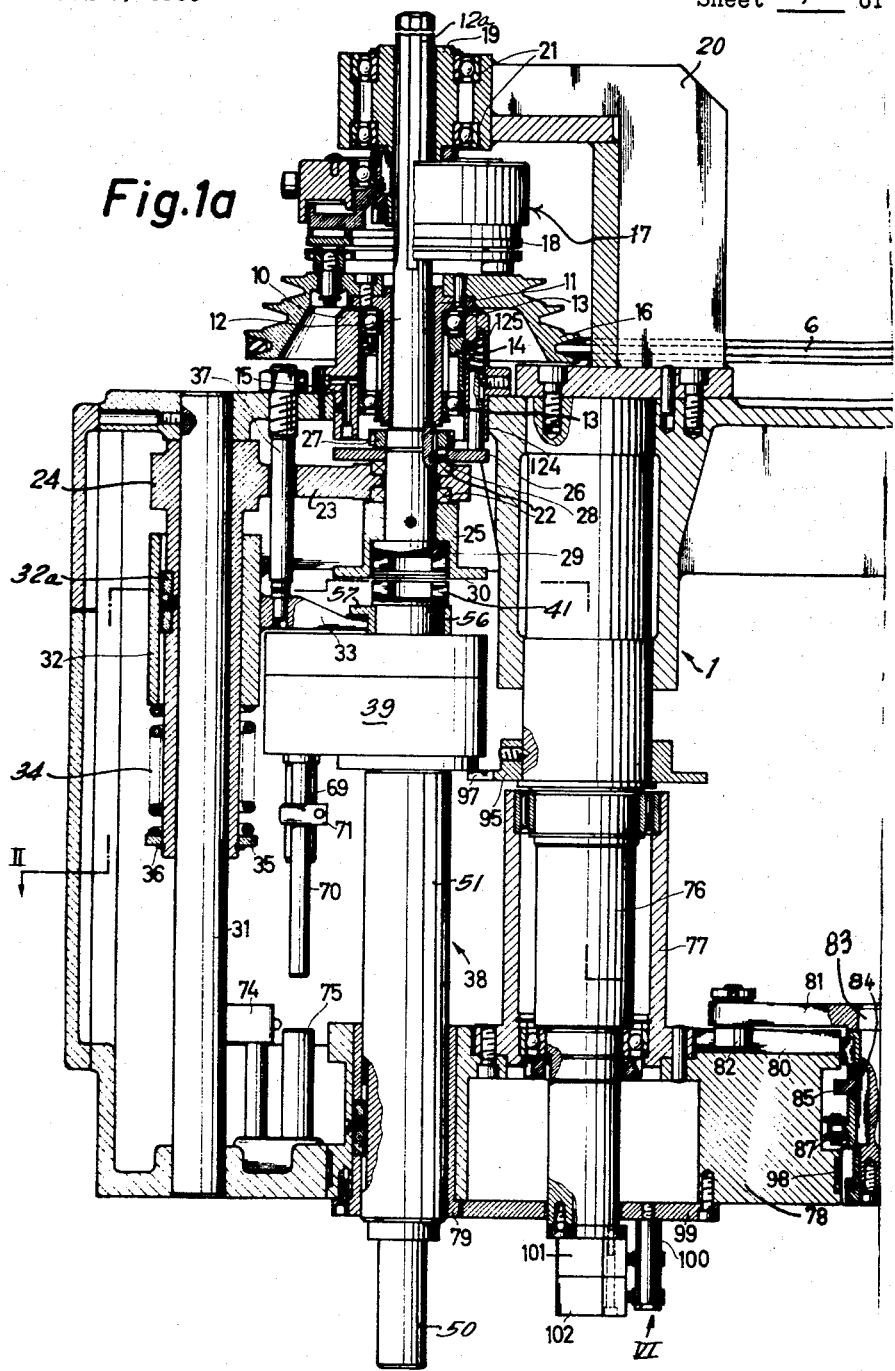
FIG. 1 (composed of FIGS. 1a and 1b) is a substantially central vertical section through a machine tool which may be utilized as a boring mill and which embodies our present invention, the section being taken in the direction of arrows substantially as seen from the line I—I of FIG. 2.

Referring to the drawings in detail, and first to FIG. 1 (composed of FIGS. 1a and 1b), there is shown a vertical boring mill (also called vertical lathe) which comprises a frame 1 supporting a prime mover here shown as an electric motor 2 whose output shaft 4 is rotatable about a vertical axis. The casing of the motor 2 is rockable about a vertical pintle 3 (see also FIG. 2) which is parallel with the output shaft 4 and enables the motor to swing in an arc in order to change the tension of an endless V-belt 6. This belt is trained around a multi-groove pulley 5 which is affixed to the output shaft 4. The means for adjusting the tension of the belt 6 comprises an eccentric cam 8 mounted on a horizontal shaft 8a which is turnable by a lever 7. The peripheral face of the cam 8 bears against a plate 9 which is affixed to the casing of the motor 2. A second lever 7a serves to lock the shaft 8a and cam 8 in a selected angular position. By actuating the lever 7, the operator can change the distance between the pulley 5 and a driven mult-groove pulley 16.

The frame 1 carries a tubular bearing member 10 (shown in the left-hand part of FIG. 1) which is bolted to the frame and accommodates a vertical bush 11 for a vertically reciprocable rotary drive shaft 12. The bush 11 is mounted in two antifriction bearings 13 whose outer races are mounted in the bearing member 10 and whose inner races are mounted on the bush. Distancing sleeves 14 hold the bearings 13 at a requisite axial distance from each other. Bores 15 in the bearing member 10 admit lubricant to the bearings 13. The bush 11 is bolted or screwed to the driven pulley 16 which latter is driven by the belt 6 and is rigidly fixed to a plate magnet 18 forming part of an electromagnetic clutch 17. The upper end portion 12a of the drive shaft 12 is splined and meshes with a sleeve-like clutch element 19 forming part of the clutch 17 and rotatable in antifriction bearings 21 provided in an L-shaped bracket 20 carried by the frame 1. When the circuit of the clutch 17 is completed, the driven pulley 16 rotates the shaft 12 at the speed determined by the motor 2.

The drive shaft 12 is surrounded by two radial antifriction bearings 22 which are mounted in a motion transmitting arm 23 forming part of a reciprocating member 24 which forms part of a reciprocating unit and can move the shaft 12 up and down. The lower bearing 22 is held against axial movement by a bell-shaped coupling member 25 which is pinned to the lower end portion of the drive shaft 12. The upper bearing 22 abuts against the underside of a plate-like brake disk 26 which is held against axial movement with reference to the shaft 12 by a lock nut 27. This lock nut also urges one race of the lower bearing 22 against the coupling member 25. A radial pin 28 connects the disk 26 for rotation with the drive shaft 12. The coupling member 25 is provided with four equidistant downwardly extending coupling claws 29 having inclined faces 30.

The reciprocating member 24 is shiftable on a vertical guide member or post 31 which is mounted in the frame 1 adjacent to and in parallelism with the drive shaft 12. This reciprocating member 24 is non-rotatably connected with a holder 32 having a projection or finger 33 which overlies the transmission case 39 of a removable spindle assembly 38. The lower end of the holder 32 rests on a helical return spring 34 which surrounds the lower part of the reciprocating member 24 and is carried by an annular retainer 35 mounted on the member 24 by a split ring 36. The finger 33 cooperates with a stop 37 which is adjustably carried by the frame 1 and whose lower end portion or tip can extend into a complementary bore of the finger 33. The connection between the reciprocating member 24 and holder 32 comprises a key 32a shown in FIGS. 1 and 2.

Figure 3:
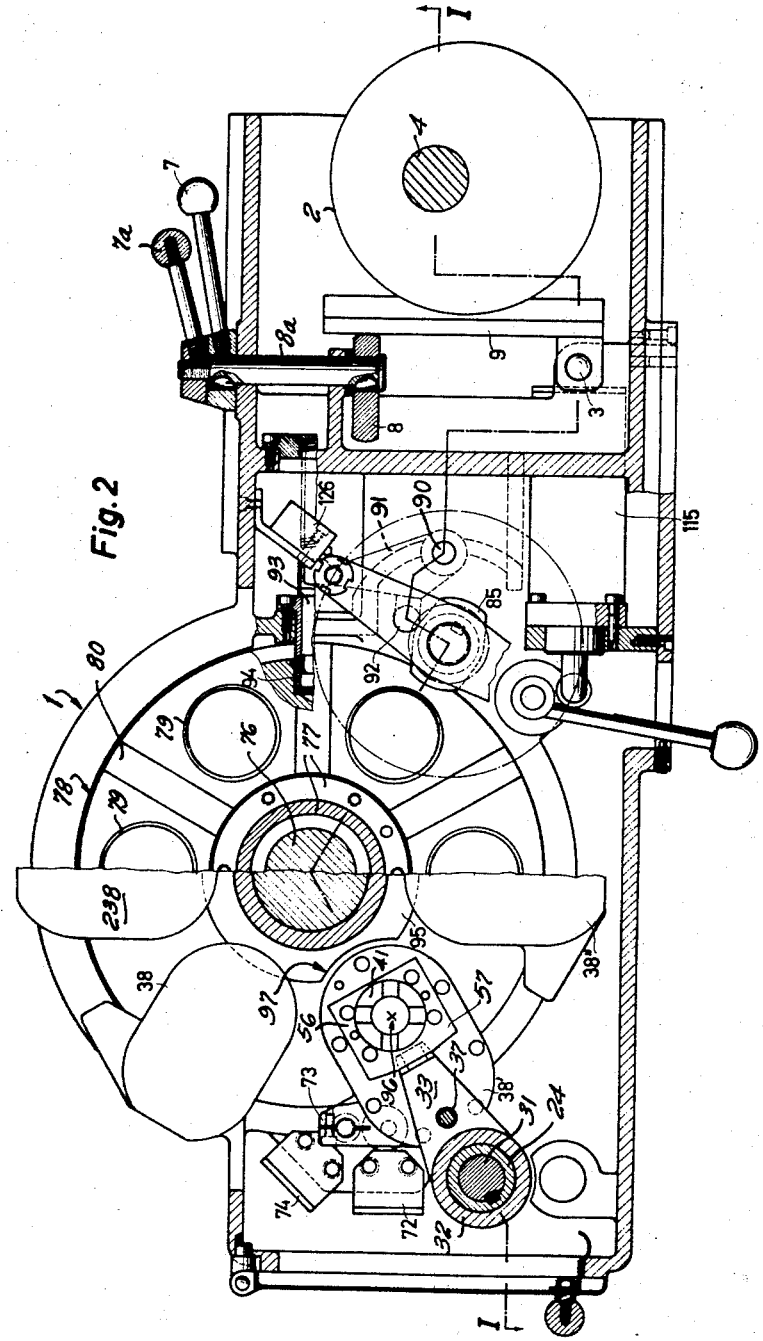
FIG. 3 is an enlarged axial section through a spindle assembly.

The spindle assembly 38 is illustrated in FIG. 3. The upper part of this assembly is constituted by the transmission case 39 accommodating an upwardly extending input shaft 40 which is connected with a clawed coupling member 41. The coupling member 41 is complementary to and may cooperate with the coupling member 25 on the lower end portion of the drive shaft 12. The lower end portion of the input shaft 40 is rotatable in a radial antifriction bearing 42 and carries a pinion 43 meshing with a gear 44 provided on an intermediate shaft 45 which is journalled in the case 39 and is parallel with the input shaft 40. The shaft 45 further carries a pinion 46 which meshes with a gear 49 keyed to the upper end of an elongated tool spindle 50. The gear 49 is coaxial with the pinion 43 and the tool spindle 50 is rotatable in a bearing 47 accommodated in the case 39. The gear 49 has an upwardly projecting stub which is rotatable in a needle bearing 48 inserted into a bore at the lower end of the input shaft 40. The tool spindle 50 is further mounted in two needle bearings 52 and in two thrust bearings 53, both accommodated in a guide sleeve 51 which surrounds with clearance the major part of the tool spindle. The upper end of the guide sleeve 51 has a flange which is bolted to the underside of the transmission case 39. The lower end portion of the spindle 50 extends beyond the lower thrust bearing 53 and may be directly coupled to a boring or other tool, not shown, so that its axis 54 coincides with the axis of such tool and with the axis of the input shaft 40. The spindle 50 constitutes the output member of a single-stage transmission 55 which includes the pinions 43, 46 and gears 44, 49. This transmission may serve as a step-down or as a step-up transmission, and it is further clear that the spindle assembly 38 may comprise a multi-stage transmission. The ratio of the transmission 55 will be selected in dependency on the nature of the tool which is to be coupled with the spindle 50, i.e., the transmission will characterize the tool and will enable the spindle 50 to transmit to the tool a desired torque.

The input shaft 40 further carries a collar 56 having a projection 57 whose purpose will be described later.

Figure 4:
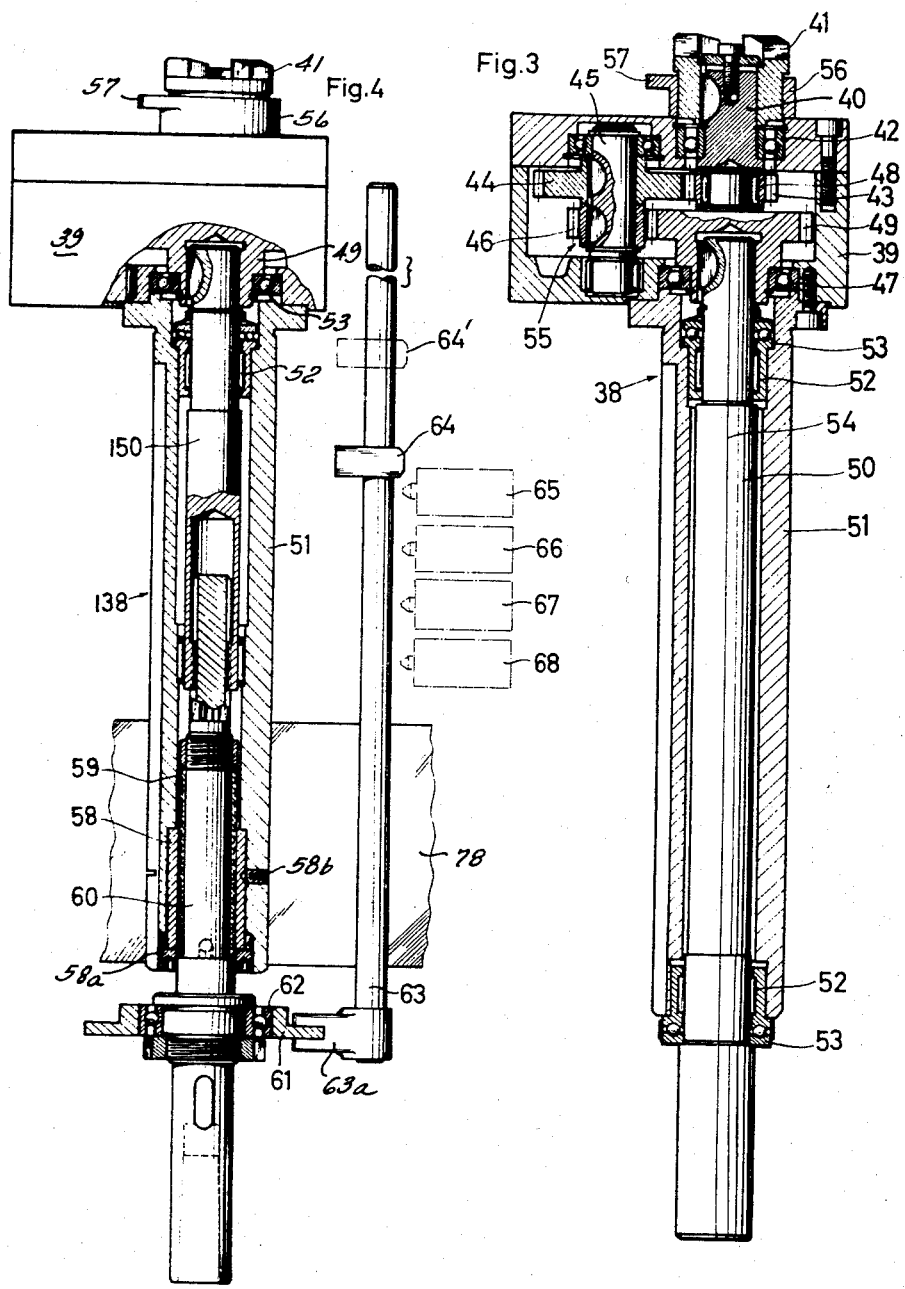
FIG. 4 is a similar axial section through a modified spindle assembly which may be utilized in thread cutting.

FIG. 4 shows a somewhat modified spindle assembly 138 which is used for cutting of threads. The construction of the transmission in the case 39 at the upper end of the guide sleeve 51 may be the same as described in connection with FIG. 3. The output member 50 is replaced by a somewhat shorter output member 150 which is rotatable in bearings 52, 53 and whose lower end is internally splined to receive the externally splined upper end of a tool spindle 60 in such a way that the latter must rotate with but is movable axially of the output member 150. The lower end portion of the guide sleeve 51 accommodates a readily removable internally threaded cylinder 58 which is retained by a nut 58a and meshes with an externally threaded cylinder 59 detachably coupled to the spindle 60. A radial screw 58b holds the cylinder 58 against movement with reference to the guide sleeve 51.

The exposed portion of the tool spindle 60 carries a radial bearing 62 for a motion transmitting member 61 which is received between the prongs of a fork 63a at the lower end of a programming bar 63 which is adjacent to an indexing drum 78. The bar 63 carries a trip 64 which can actuate a series of programming switches here shown as limit switches 65, 66, 67 and 68 fixedly mounted on a stationary part of the frame 1. The lower end of the tool spindle 60 can be directly coupled to a tap or another suitable thread cutting tool. The motion transmitting member 61 need not share angular movements of the tool spindle 60 and the trip 64 is adjustable in the longitudinal direction of the bar 63 (see the phantom-line position 64'). The switches 65–68 cause the spindle 60 to perform a rapid advance, a feed movement, to reverse the direction of its rotation the coupling member 41 at the upper end of the spindle and to rapidly return to its starting position. When assembly 138 shown in FIG. 4 is moved into alignment with the coupling member 25 of the drive shaft 12, the motion transmitting member 61 automatically enters between the prongs of the programming bar 63 so that the latter is properly coupled to the spindle assembly. The assembly 138 is removably mounted in the indexing drum 78 in the same way as will be described in connection with the spindle assembly 38.

One of the limit switches 65–68 will reverse the polarity of the motor 2 when the thread cutting tool reaches the end of its working stroke. The assembly 138 may also comprise a length-compensating coupling which is not shown in FIG. 4.

Referring again to FIG. 1, it will be seen that the spindle assembly 38 comprises an elongated rod-shaped carrier 70 and a movable stop 69 both secured to and extending downwardly from the transmission case 39. The carrier 70 supports an adjustable trip 71 which can actuate a limit switch 72 (see FIG. 2) serving to terminate the rapid advance movement of the output member 50. The stop 69 is releasably secured to an arm 73 (see FIG. 2) and performs two functions including actuating a limit switch 74 which controls a time-lag relay (not shown) serving to terminate the downward (feed) movement of the output member 50. At such time, the lower end face of the stop 69 abuts against a fixed stop 75 which is mounted in the frame 1. FIG. 1 shows that the lower end of the stop 69 engages the limit switch 74 shortly before it reaches the top face of the fixed stop 75.

Figure 2:
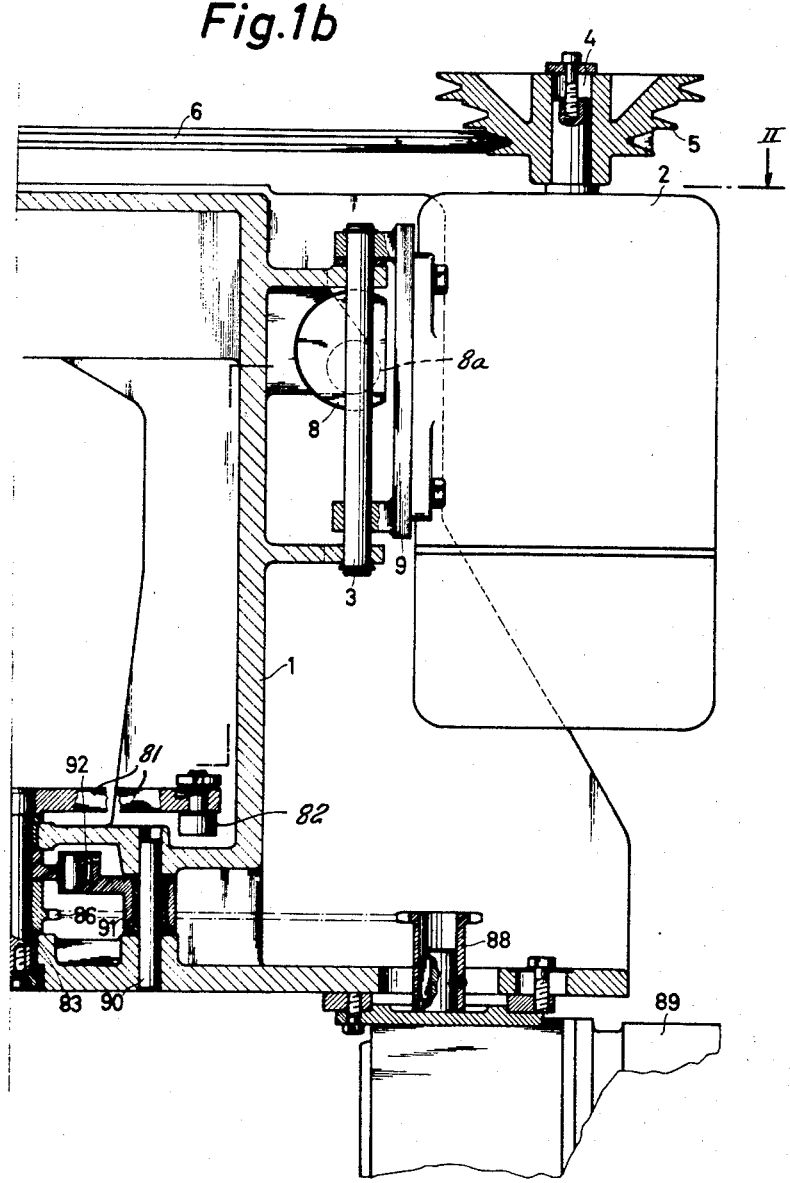
FIG. 2 is a composite horizontal section substantially as seen in the direction of arrows from the line II–II of FIG. 1.

The frame 1 further carries a fixed upright column 76 which in turn carries a rotary cylinder 77. The latter is rigidly connected with the indexing drum 78. FIG. 2 shows that the indexing drum 78 can support a total of six equidistant bearings sleeves 79 and FIG. 1 shows that each sleeve 79 can accommodate the guide sleeve 51 of a spindle assembly 38 or 138. The arrangement is such that the guide sleeves 51 are movable axially of but cannot rotate with reference to the bearing sleeves 79, see also FIG. 6. The upper end face of the indexing drum 78 is formed with six radially extending equidistant grooves 80 each adapted to receive one of two rollers 82 provided on the arms of a two-armed indexing lever 81 forming part of a Geneva movement which in turn forms part of the indexing mechanism. This lever 81 can transmit to the indexing drum 78 intermittent movements so as to place successive spindle assemblies 38 and/or 138 into registry with the drive shaft 12. The lever 81 is fixed to a shaft member 83 which is parallel to the column 76 and is rotatable in the frame 1. A key 84 connects the shaft member 83 with a cam 85 and with a sprocket 86 meshing with an endless chain 87. The latter is also trained around a second sprocket 88 which is driven by an electric indexing motor 89, e.g., a gear motor. The motor 89 is attached to the frame 1.

A vertical pivot pin 90 which is mounted in the frame 1 supports a lever 91 which comprises a plurality of arms and carries a roller follower 92 cooperating with the cam 85. A free arm of the lever 91 is articulately coupled to a lock pin 93 (see FIG. 2) and can move this pin in the radial direction of the indexing drum 78 so that the pin may enter one of six sockets 94 provided in the periphery of the drum 78 in order to temporarily block the drum. The cam 85 can cause the roller follower 92 to rock the lever 91 in a sense to move the lock pin 93 away from the drum 78 so that the latter can be indexed to a new position. The configuration of the cam 85 is such that the drum 78 is unlocked (i.e., that the lock pin 93 is withdrawn from the adjoining socket 94) when one of the rollers 82 on the indexing lever 81 enters one of the grooves 80.

The column 76 further supports a fixed carrier here shown as a ring 95 which serves as an abutment or stop for all such spindle assemblies 38 or 138 which are not in registry with the drive shaft 12. As best shown in FIG. 2, the carrier 95 has a concave cutout 97 serving to accommodate a portion of that assembly 38 or 138 which has been moved into alignment with the drive shaft 12 and is ready to be coupled therewith. In FIG. 2, the cutout 97 accommodates a portion of a spindle assembly 38' (corresponding to the assembly 38 of FIG. 3) which maintains the axis of its output member 50 in alignment with the axis 96 of the drive shaft 12. The cutout 97 is large enough to allow for vertical movements of the assembly 38'. The projection 57 of the collar 56 forming part of the assembly 38' then overlies the finger 33 of the holder 32.

The lower part of FIG. 1 shows that the periphery of the indexing drum 78 can rotate in a needle bearing 98 which is mounted in the frame 1. This drum 78 carries at its underside a polygonal plate 99 (see also FIG. 6) which carries a series of downwardly extending pins or trips 100 each of which is associated with one of the spindle assemblies 38 or 138. The column 76 extends downwardly through a central passage of the indexing drum 78 and its lower end portion carries limit switches 101, 102 which can be tripped by the pins 100 in response to rotation of the drum 78.

Referring now to FIGS. 6 to 8, it will be seen that the underside of the indexing drum 78 carries a series of radially distributed ways 103 which carry slides 104 serving to influence the forward speed of the respective spindle assemblies. Each of the ways 103 accommodates a single reciprocable hammer-shaped or T-shaped slide 104 which is biased by a spring 105 (see FIG. 8) so that it tends to move outwardly of the drum 78. Clamps 106, controlled by knurled screws 107, serve to fix the slides 104 in selected positions. Screws 108 hold the slides 104 against rotation. The cam 104a at the outer end of the slide 104 shown in FIGS. 6 and 8 engages a roller follower 109 which is mounted on a lever 110. The latter is fixed to a shaft 111 by a diametral pin or the like and the shaft 111 is mounted in bearings 112 provided in the frame 1. The free end of the shaft 111 carries a handle 113 which is long enough to extend from the frame 1. This handle 113 is actuatable to operate the link train 114 of a regulating device 115 shown in FIG. 2. The handle 113 further carries an index 116 (FIG. 8) which cooperates with a graduated scale 117 on the frame 1. If the screw 107 is loose and the operator rocks the handle 113, the slide 104 follows the bias of the spring 105 and its cam 104a remains in abutment with the follower roller 109 on the lever 110. When the handle 113 has been moved to a desired angular position (indicated by a given graduation on the scale 117), i.e., when the speed at which a given tool spindle is to be fed while its tool engages a workpiece has been properly selected, the operator drives the screw 107 home to thereby fix the slide 104 with reference to the corresponding ways 103.

The regulating device 115 controls the valves for a cylinder-and-piston assembly 118, 119 which will be described in connection with FIG. 5 and which forms part of the reciprocating means for the drive shaft 12. Thus, the device 115 can select the speed at which a tool is fed toward and during engagement with a workpiece W.

Figure 5:
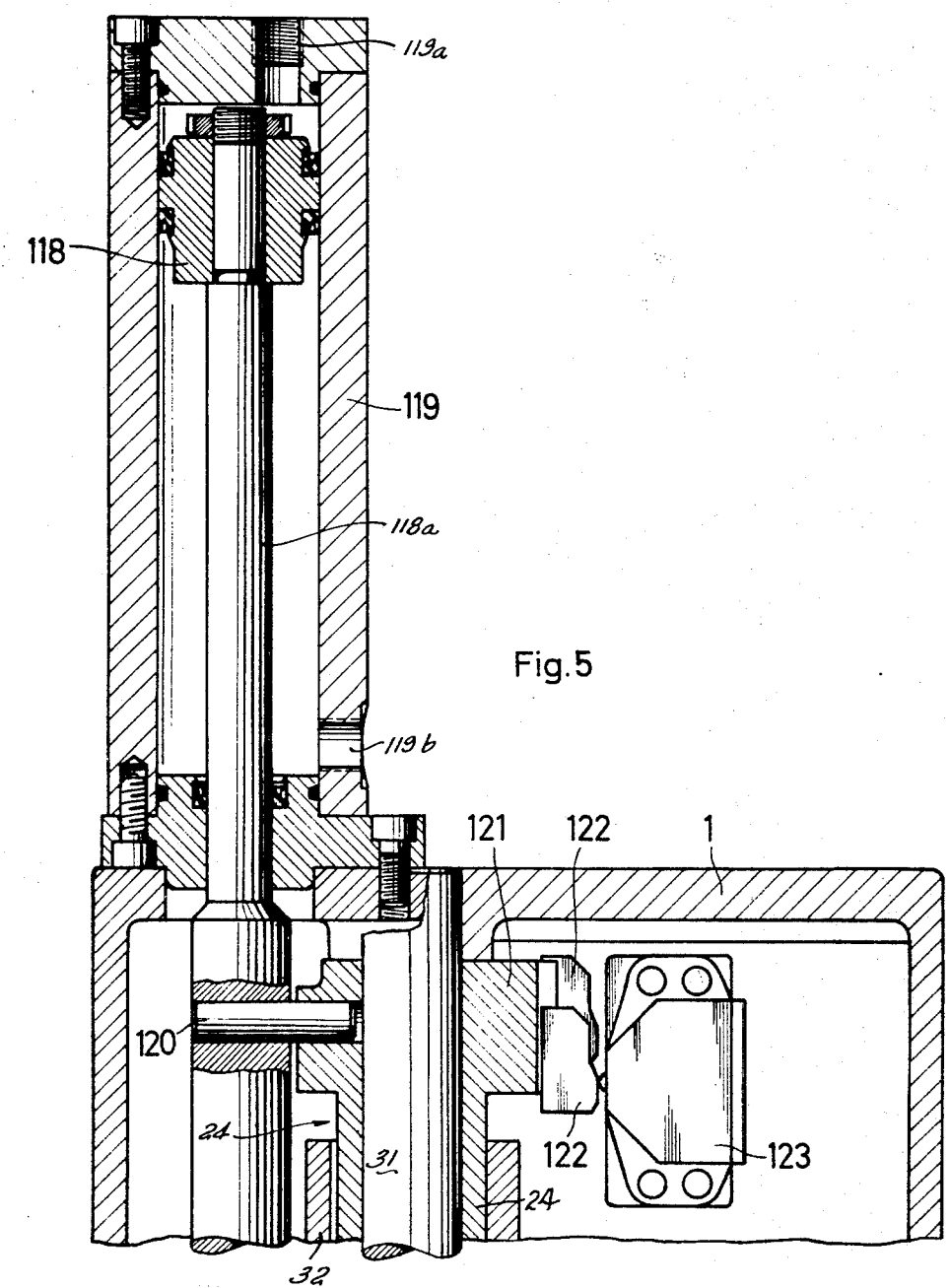
FIG. 5 is an enlarged axial section through a cylinder-and-piston unit which serves to effect reciprocation of the drive shaft.

The reciprocating member 24 for the drive shaft 12 is movable along the post 31 by a cylinder-and-piston unit including a piston 118 which is reciprocable in a double-acting cylinder 119 shown in FIG. 5. The cylinder 119 is attached to the frame 1 and the piston rod 118a of the piston 118 extends downwardly and is coupled to the reciprocating member 24 by a diametral pin 120. The upper end portion 121 of the member 24 carries trips 122 which can actuate a multiple-contact limit switch 123 secured to the frame 1. The switch 123 controls the operation of valves (not shown) which in turn control the flow of a hydraulic fluid to and from the ports 119a, 119b of the cylinder 119. Such valves regulate the rapid advance, feed movement, dwell and return movements of the output member 50 or 150 forming part of that spindle assembly 38 or 138 which registers with the drive shaft 12.

The operation of the boring machine is as follows:

The motor 2 is started and the pump (not shown) which can supply oil or another suitable hydraulic fluid to the one or the other port 119a, 119b of the cylinder 119 is also started. The circuit which includes the various electric switches comprises a suitable source of electrical energy and the main switch or master switch (not shown) of the machine is closed so that the machine is ready for use. One of the spindle assemblies is located in operative position. FIG. 2 shows that a spindle assembly 38' (corresponding to the assembly 38 of FIG. 3) is in registry with the drive shaft 12 and is located therebelow. Its guide sleeve 51 is received in the corresponding bearing sleeve 79 of the indexing drum 78 which latter is held against rotation by the lock pin 93. Thus, the transmission case 39 of the spindle assembly 38' extends into the cutout 97 of the carrier 95.

By actuating a valve (not shown) in response to closing of a control switch, the operator admits oil through the upper port 119a of the cylinder 119 so that the piston 118 moves downwardly and its piston rod 118a shifts the reciprocating member 24 by way of the pin 120 so that the member 24 moves downwardly by sliding along the guide member 31. The motion-transmitting arm 23 of the member 24 entrains the drive shaft 12 so that the latter slides in the clutch element 19 but is ready to be driven thereby. As the drive shaft 12 descends, its coupling member 25 moves toward and ultimately engages the coupling member 41 of the spindle assembly 38'. The descending reciprocating member 24 moves one of its trips 122 into engagement with one contact of the limit switch 123 whereby the latter causes the output member 50 of the assembly 38' to rapidly advance toward the workpiece W (see FIG. 1) which is mounted on a table T or another suitable work holder located at a level below the assembly 38'. At the same time, another trip 122 of the reciprocating member 24 actuates another contact of the limit switch 123 whereby the latter completes the electric circuit of the clutch 17. The clutch 17 connects the driven pulley 16 with the clutch element 19 (via magnet 18) so that the clutch element 19 begins to rotate and drives the shaft 12. In other words, the output member 50 of the spindle assembly 38' begins to rotate only when the coupling including the members 25, 41 is operative, namely, after the drive shaft 12 is properly connected with the input member 40 of the transmission 55 in the case 39 of the assembly 38'.

When the trip 71 on the carrier 70 reaches the limit switch 72, the rapid advance of the assembly 38' is terminated and the output member 50 is then fed at a reduced speed such as is best suited to carry out the actual boring operation. The feed movement of the output member 50 is about to be terminated when the movable stop 69 trips the limit switch 74 (see FIG. 2) which latter energizes a time-lag relay while the stop 69 continues to move through a short distance toward and against the fixed stop 75. The stop 75 is mounted at a level slightly below the limit switch 74. The aforementioned time-lag relay then causes the tool spindle 50 to rapidly return upwardly and away from the workpiece W whereby the reciprocating member 24 also moves upwardly followed by the holder 32 which is biased by the return spring 34. The finger 33 of the holder 32 engages the projection 57 and lifts the spindle assembly 38' until the finger 33 engages the stop 37. The reciprocating member 24 continues to move upwardly and raises the drive shaft 12 so that the coupling member 25 is disengaged from the complementary coupling member 41 of the assembly 38'. When a trip 122 on the member 24 reaches the corresponding contact of the limit switch 123, the latter opens the circuit of the clutch 17 so that the driven pulley 16 is disconnected from the drive shaft 12 and the drive shaft ceases to rotate. At the same time, the brake disk 26 engages a friction-generating stud 124 which is mounted in the frame 1 so that the drive shaft 12 is brought to a full stop. The stud 124 is biased downwardly by a helical expansion spring 125 shown in the upper left-hand part of FIG. 1.

Another contact of the limit switch 123 completes the circuit of the indexing motor 89 as soon as the reciprocating member 24 returns to its upper end position. The sprocket 88 then drives the chain 87 which drives the sprocket 86 to rotate the indexing lever 81. Before one of the rollers 82 enters the adjoining groove 80 of the indexing drum 78, the cam 85 shifts the follower roller 92 to rock the lever 91 whereby the latter withdraws the lock pin 93 from the adjoining socket 94 so that the drum 78 is released and can be rotated by the lever 81. This lever turns the drum 78 in a clockwise direction, as viewed in FIG. 2, and through an angle of 60 degrees so as to place the next spindle assembly 38″ into registry with the drive shaft 12. As the drum 78 rotates, the transmission case 39 of the spindle assembly 38′ moves above the carrier 95 and is held by the latter against downward movement. At the same time, the transmission case 39 of the spindle assembly 38″ enters the cutout or notch 97 of the carrier 95 and is free to descend as soon as the reciprocating member 24 is again caused to move downwardly, i.e., as soon as the cylinder 119 again receives oil through the upper port 119a.

The indexing lever 81 ceases to rotate when its second arm engages a limit switch 126 (see FIG. 2) which opens the circuit of the indexing motor 89. Also, the cam 85 allows the lock pin 93 to enter the next socket 94 so that the indexing drum 78 is locked in an angular position in which the spindle assembly 38″ is ready to descend with the drive shaft 12. The next boring operation (by means of the tool which is attached to the output member 50 of the assembly 38″) is then carried out in the same way as described above for the assembly 38′. The extent of rapid advance and feed movement of the assembly 38″ is determined beforehand by the stop 69 and trip 71 on the carrier 70. The exact speed of the spindle assembly 38″ during rapid advance and during feed is determined by the setting of the corresponding slide 104 which controls the regulating device 115.

If one of the bearing sleeves 79 remains unoccupied, the operator removes the corresponding trip 100 so that the limit switch 101 is not actuated and the limit switch 126 does not arrest the indexing motor 89 whereby the indexing drum 78 is automatically rotated through an angle of 120 degrees to place the next-following spindle assembly into registry with the drive shaft 12. The same operation is repeated if two consecutive bearing sleeves 79 remain empty; the motor 89 then rotates the drum 78 through an angle of 180 degrees.

A very important advantage of our improved machine tool is seen to reside in that each spindle assembly 38 or 138 is provided with a separate transmission of any desired ratio and that such spindle assemblies are removably receivable in the bearing sleeves 79 of the indexing drum 78. When the drive shaft 12 is vertical and when the indexing drum 78 is arranged to rotate about a fixed vertical axis (such as the axis of the column 76), the spindle assemblies 38 and/or 138 need not be coupled with the indexing drum because each freshly inserted spindle assembly is automatically located in requisite position in that its transmission case 39 comes to rest on the ring-shaped carrier 95. Due to such construction of indexing means that only a single spindle assembly 38 or 138 can be placed into registry with the drive shaft 12, and also because the cutout 97 allows such single spindle assembly to move with the drive shaft 12, the indexing drum 78 can be mounted in a fixed axial position, i.e., it need not participate in reciprocatory movements of the shaft 12. The wear on the transmissions 55 is relatively small because only one such transmission is in use at a time. Furthermore, the operator can rapidly convert the machine tool for a different type of operation because each spindle assembly 38 or 138 can be removed and replaced without resorting to any tools. The number of different setups is limited only by the number of different spindle assemblies and/or by the number of different tools which are available to the operator. The same holds true for the rotational speed of tools which are connected with the output members of the spindle assemblies. The spindle assemblies may utilize transmissions with a ratio of 0.5–4. Such range of transmission ratios normally suffices for all types of boring, reaming, threadcutting, abrading and related operations.

Referring again to FIG. 2, the loading station where the operator or an automatic transfer device can remove or insert spindle assemblies 38 or 138 may be located in a position at an angle of 120 degrees with reference to the actual working station (i.e., to that station which accommodates the spindle assembly 38′). For example, the assembly 238 shown in FIG. 2 can be assumed to be located at the loading station where it is ready to be removed from the indexing drum 78.

Another very important advantage of the improved machine tool resides in such mounting of the drive shaft 12 that the latter begins to rotate only after it is properly coupled with the input member 40 of a spindle assembly. This reduces the wear on the rotating parts and insures that the acceleration of the output member takes place without shocks. While the drawings show a machine tool wherein the reciprocating member 24 is movable by a cylinder-and-piston unit 118, 119, the latter unit may be replaced by a hand-operated device or the system of valves which control the flow of fluid to and from the cylinder 119 may include a manually operated rotary slide valve or the like.

The trips and analogous control devices which regulate the speed at which the tool of a given spindle assembly moves toward a workpiece and the speed at which the tool penetrates into a workpiece are adjustable so that each spindle assembly may be advanced at a different speed, either toward and into engagement with or away from the workpiece. In other words, and if the spindle assemblies carry boring tools, the depth of bores produced by such tools may but need not be the same and the extent to which consecutive tools penetrate into a single workpiece or into a series of successive workpieces need not vary gradually but may decrease or increase in any desired sequence. The aforementioned fixed and movable stops 75 and 69 will determine the maximum extent of penetration of a tool into a fixed workpiece.

The r.p.m. of the drive shaft 12 may be varied by proper selection of grooves in the driven and driving pulleys 16, 5 in which the belt 6 is mounted. The motor 2 is preferably a polyphase motor which can be driven at a plurality of speeds, either in forward or in reverse.

The machine of our invention can be installed adjacent to a mechanically or hydraulically movable table T or a like work holder which is provided with clamping means to hold a workpiece W in requisite position. The frame should be heavy and strong enough to provide a satisfactory support for the remaining parts of the machine. In some instances, the frame 1 will be secured directly to the floor or to a fixed base. However, it is equally possible to construct the frame 1 as an attachment which can be separably fixed to the housing of a multiple-purpose machine, for example, in a production line or the like. FIG. 2 shows a frame 1 which is constructed and configured for the purpose of being connectable to a multiple-purpose machine.

Without further analysis, the foregoing will so fully reveal the gist of the present invention that others can, by applying current knowledge, readily adapt it for various applications without omitting features which fairly constitute essential characteristics of the generic and specific aspects of our contributions to the art and, therefore, such adaptations should and are intended to be comprehended within the meaning and range of equivalence of the following claims.

What is claimed as new and desired to be protected by Letters Patent is:

1. In a machine tool, a frame; a rotary drive shaft reciprocatably received in said frame and comprising a first coupling member; indexing means comprising an indexing member movable to a plurality of positions; a plurality of spindle assemblies removably and reciprocably supported by said indexing member in such distribution that one thereof can register with said shaft between successive movements of said indexing member, each of said assemblies comprising a rotary input member including a second coupling member aligned with said first coupling member when said shaft registers with the respective assembly, a rotary output member adapted to be connected with a tool, and a gear transmission between said input and said output member; and reciprocating means for moving said shaft toward and away from said indexing member so that, while moving toward said indexing member, the first coupling member can engage and transmit torque to the second coupling member of that assembly which registers with said shaft.

2. A structure as set forth in claim 1, wherein said reciprocating means is arranged to move said drive shaft through strokes of such length that, subsequent to engagement of said first coupling member with a second coupling member, the respective assembly is shifted with reference to said indexing member to move the tool carried by the corresponding output member into actual engagement with a workpiece.

3. A structure as set forth in claim 2, further comprising programming means including adjustable devices for regulating the operation of said reciprocating means to move said drive shaft at a plurality of speeds including a higher speed while a tool is moved toward and a lower speed while a tool engages a workpiece.

4. A structure as set forth in claim 3, wherein said programming means comprises a fixed stop provided on said frame and a second stop provided on each of said spindle assemblies, said fixed stop being located in the path of and being engaged by the second stop of that spindle assembly which moves with said drive shaft whereby said fixed stop determines the maximum stroke of said shaft.

5. A structure as set forth in claim 4, wherein said programming means includes limit switch means actuatable by a second stop while the latter moves toward said fixed stop and delay means controlled by said limit switch means to effect return movement of said drive shaft in a direction away from said indexing member.

6. A structure as set forth in claim 2, further comprising manually actuatable means for regulating the operation of said reciprocating means.

7. A structure as set forth in claim 2, further comprising regulating means for controlling the speed at which said drive shaft is reciprocated with and relative to a spindle assembly which registers therewith.

8. A structure as set forth in claim 7, wherein said regulating means comprises an adjustable regulating device operatively connected with said reciprocating means, a plurality of ways provided on said indexing member, slides reciprocably received in such ways, and means for adjusting such slides with reference to the corresponding ways.

9. A structure as set forth in claim 8, wherein said adjusting means comprises a manually movable member and cooperating scale and index means provided on said manually movable member and said frame to indicate the extent of adjustment.

10. A structure as set forth in claim 8, wherein said regulating means further comprises resilient means for biasing said slides with reference to the corresponding ways and means for fixing said slides in selected positions of adjustment.

11. A structure as set forth in claim 10, wherein each of said slides comprises a cam and further comprising a shaft member rotatably mounted in said frame, a lever mounted on said shaft member and having a follower engageable by said cams, and handle means for adjusting said lever through the intermediary of said shaft member.

12. A structure as set forth in claim 2, wherein said reciprocating means comprises a reciprocating member coupled with said drive shaft, a guide member supporting said reciprocating member for movement in parallelism with the axis of said shaft, and a variable-speed unit for moving said reciprocating member with reference to said guide member, and further comprising a drive for said shaft including an electromagnetic clutch and programming means for completing and opening the circuit of said clutch and for selecting the speed of said unit, said programming means comprising limit switch means fixed to said frame and trip means provided on said reciprocating member.

13. A structure as set forth in claim 2, wherein at least one of said spindle assemblies is arranged to support a thread cutting tool and comprises a length-compensating coupling device.

14. A structure as set forth in claim 2, wherein at least one of said spindle assemblies is arranged to support a thread cutting tool and comprises a guide sleeve for the respective output member and a pair of intermeshing threaded cylinders removably accommodated in said guide sleeve.

15. A structure as set forth in claim 14, wherein said last named output member extends from said guide sleeve and further comprising a motion transmitting member carried by said output member outside of said guide sleeve, and programming means for controlling the extent, speed and direction of movement of said last named output member, said programming means comprising a programming bar arranged to be coupled with said motion transmitting member when said one spindle assembly registers with said drive shaft, trip means provided on said bar, and limit switches adjacent to the path of said trip means.

16. A structure as set forth in claim 1, wherein said indexing member is rotatable about a fixed axis which is parallel with the axis of said drive shaft, said indexing means further comprising a Geneva movement for intermittently rotating said indexing member about said fixed axis to place successive assemblies into registry with said drive shaft.

17. A structure as set forth in claim 1, wherein said reciprocating means comprises a reciprocating member coupled with said drive shaft and an elongated guide member parallel with said shaft and slidably supporting said reciprocating member.

18. A structure as set forth in claim 17, wherein said reciprocating member comprises a motion transmitting portion which is coupled to said drive shaft and further comprising friction reducing means interposed between said drive shaft and said motion transmitting portion.

19. A structure as set forth in claim 17, further comprising a holder reciprocably supported by said guide member and having a portion engaging that spindle assembly which registers with said drive shaft to transmit motion to such spindle assembly in response to movement of said reciprocating member in a direction to advance the shaft toward said indexing member.

20. A structure as set forth in claim 19, further comprising means for non-rotatably connecting said reciprocating member with said holder so that the latter is movable with reference to the reciprocating member in the longitudinal direction of said guide member, said holder having a projection overlying that spindle assembly which registers with said drive shaft and further comprising biasing means for urging said holder away from such spindle asembly.

21. A structure as set forth in claim 20, wherein each of said spindle assemblies comprises a projection which is engaged by the projection of said holder when a spindle assembly registers with said drive shaft, such projections cooperating to move the respective spindle assembly with the holder when the latter is moved by said biasing means.

22. A structure as set forth in claim 19, further comprising stop means provided on said frame for arresting said holder in a predetermined position while said reciprocating member moves the drive shaft away from said indexing member.

23. A structure as set forth in claim 22, further comprising biasing means for urging said holder against said stop means, said reciprocating means being arranged to move said drive shaft through strokes of such length that, when said holder is arrested by said stop means to thereby arrest a spindle assembly, said shaft is movable further away from said indexing member to disengage said first coupling member from the aligned second coupling member.

24. A structure as set forth in claim 17, wherein said reciprocating means further comprises a fluid-operated cylinder and piston unit operatively connected with and arranged to move said reciprocating member with reference to said guide member.

25. A structure as set forth in claim 1, wherein said drive shaft is reciprocable up and down and said spindle assemblies are reciprocable in parallelism with said drive shaft, and further comprising a fixed carrier for supporting in an uppermost position each such spindle assembly which is also supported by said indexing member but is out of registry with said drive shaft.

26. A structure as set forth in claim 1, further comprising a drive for said shaft including a driven pulley rotatable on said shaft and clutch means operative to couple said pulley with said shaft.

27. A structure as set forth in claim 26, wherein said pulley is a multi-stage pulley.

28. A structure as set forth in claim 26, wherein said drive further comprises a second pulley, a prime mover for driving said second pulley, an endless belt trained around said pulleys, and adjusting means for regulating the tension of said belt.

29. A structure as set forth in claim 28, wherein said prime mover and said second pulley are movable toward and away from said driven pulley and said adjusting means comprises means for moving said prime mover and said second pulley with reference to said driven pulley.

30. A structure as set forth in claim 1, wherein said drive shaft has an end portion adjacent to said indexing member and said first coupling member is affixed to said end portion, said first coupling member and each second coupling member having claws engaging each other when said drive shaft is moved toward the coupling member of the registering spindle assembly.

31. A structure as set forth in claim 1, further comprising a drive for rotating said shaft in response to displacement of said shaft toward said indexing member and a brake for arresting said shaft upon disengagement from said drive.

32. A structure as set forth in claim 31, wherein said brake comprises a plate fixed to said drive shaft and a spring-biased friction generating member engaging said plate when the shaft is disengaged from said drive.

33. A structure as set forth in claim 1, further comprising a supporting column fixed to said frame in parallelism with said shaft, a tubular member rotatably supported by said column and fixed to said indexing member so that the latter is rotatable about said column, and antifriction bearing means interposed between said indexing member and said frame.

34. A structure as set forth in claim 33, wherein said indexing member comprises a drum and said bearing means forms an annulus between said frame and the periphery of said drum.

35. A structure as set forth in claim 1, wherein each of said spindle assemblies comprises a case which accommodates the respective transmission and a guide sleeve connected with said case and rotatably receiving a portion of the respective output member.

36. A structure as set forth in claim 1, wherein said indexing member comprises a drum which is rotatable about a fixed axis and further comprising a column rotatably supporting said drum and programming means for controlling reciprocatory movements of said drive shaft and rotary movements of said drum, said programming means comprising limit switches provided on said column and trips provided on said drum and arranged to actuate said switches in response to angular displacement of said drum.

37. A structure as set forth in claim 1, wherein said frame constitutes an attachment which is connectable with special-purpose machines.

38. In a machine tool, a frame; a rotary drive shaft reciprocably received in said frame and comprising a first coupling member; indexing means comprising an indexing member rotatable to a plurality of positions about a fixed axis defined by a column mounted in said frame; a plurality of spindle assemblies removably and reciprocably supported by said indexing member in such distribution that one thereof can register with said shaft between successive movements of said indexing member, each of said assemblies comprising a rotary input member including a second coupling member aligned with said first coupling member when said shaft registers with the respective assembly, and a rotary output member adapted to be connected with a tool; a fixed carrier for supporting in an uppermost position each such spindle assembly which is also supported by said indexing member but is out of registry with said drive shaft, said carrier comprising a ring fixed to said column and having a cutout receiving a portion of that spindle assembly which registers with the drive shaft so that such spindle assembly can be moved downwardly with the drive shaft; and reciprocating means for moving said drive shaft toward and away from said indexing member so that, while moving toward said indexing member, the first coupling member can engage and transmit torque to the second coupling member of said assembly which registers with said shaft.

39. In a machine tool, a frame; a rotary drive shaft reciprocably received in said frame and comprising a first coupling member; indexing means comprising an indexing member in form of a drum rotatable about a fixed axis which is parallel to the axis of said drive shaft, and a Geneva movement for intermittently rotating said drum about said fixed axis, said movement comprising a lever rotatable about a second fixed axis which is parallel with the axis of said shaft and having arms extendable into grooves provided in said drum to rotate the latter, and motor means for intermittently rotating said lever; a plurality of spindle assemblies removably and reciprocably supported by said indexing member in such distribution that one thereof can register with said shaft between successive movements of said indexing member, each of said assemblies comprises a rotary input member including a second coupling member aligned with said first coupling member when said shaft registers with the respective assembly, and a rotary output member adapted to be connected with said tool; and reciprocating means for moving said shaft toward and away from said indexing member so that, while moving toward said indexing member, the first coupling means can engage and transmit torque to the second coupling member of that assembly which registers with said shaft.

40. A structure as set forth in claim 39, wherein each arm of said lever is provided with a roller and said grooves are provided in one end face of and extend radially with reference to said drum.

41. A structure as set forth in claim 39, further comprising locking means for automatically holding said drum against rotation when said motor means is idle.

42. A structure as set forth in claim 41, wherein said locking means comprises sockets provided on said drum and a lock pin controlled by said Geneva movement and arranged to enter one of said sockets when a spindle assembly registers with said shaft.

43. A structure as set forth in claim 42, wherein said indexing means further comprises a cam rotatable with said lever about said second fixed axis and follower means arranged to track said cam and operatively connected with said lock pin to withdraw the latter from a socket when said lever is rotated by said motor means.

44. A structure as set forth in claim 39, wherein said lever comprises two arms and further comprising means for arresting said motor means in response to rotation of said lever through one half of a full revolution.

References Cited

UNITED STATES PATENTS

| | | | |
|---|---|---|---|
| 2,383,671 | 8/1945 | Muerle | 74—242.15 |
| 2,720,123 | 10/1955 | Viehweger | 74—242.15 |
| 2,952,170 | 9/1960 | Hansen et al. | 77—25 |
| 2,956,454 | 10/1960 | Hansen | 77—25 |
| 3,051,285 | 8/1962 | West et al. | 192—18 |
| 3,074,147 | 1/1963 | Miller et al. | 77—25 |
| 3,133,349 | 5/1964 | Riedel | 77—25 |
| 3,174,222 | 3/1965 | Pohl | 77—25 |
| 3,203,017 | 8/1965 | Holzl | 77—25 |

GERALD A. DOST, *Primary Examiner.*

U.S. Cl. X.R.

29—26, 630; 74—242.15; 77—25; 339—198, 244, 272